Patented Mar. 13, 1923.

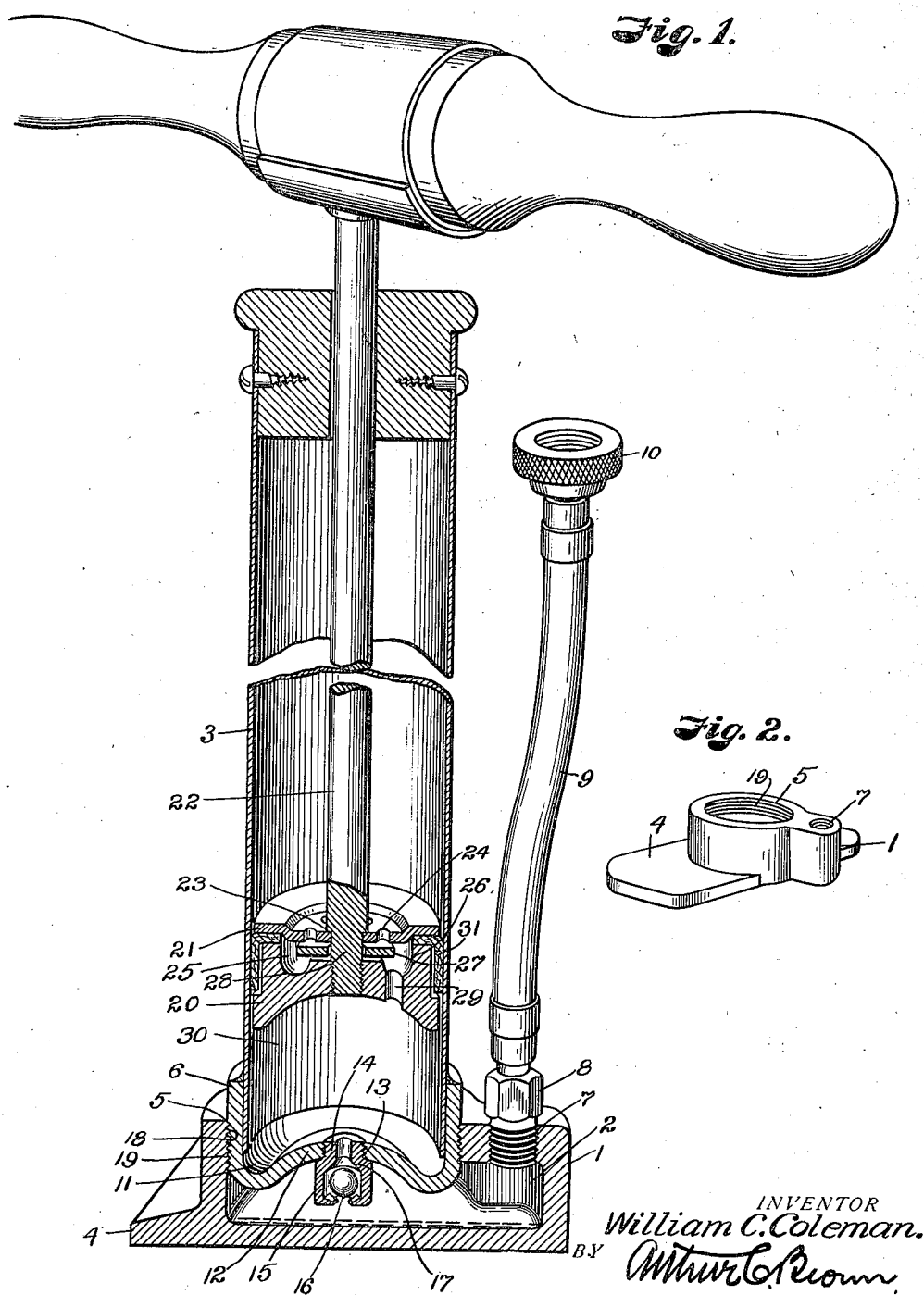

1,447,963

UNITED STATES PATENT OFFICE.

WILLIAM COFFIN COLEMAN, OF WICHITA, KANSAS.

AIR PUMP.

Application filed July 2, 1921. Serial No. 482,012.

*To all whom it may concern:*

Be it known that I, WILLIAM COFFIN COLEMAN, a citizen of the United States, residing at Wichita, in the county of Sedgwick and State of Kansas, have invented certain new and useful Improvements in Air Pumps; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to air pumps particularly applicable for use for inflating tires and the primary object of the invention is to provide an inexpensive, efficient and durable pump so constructed that liability of oil entering the tire during the action of the pump will be eliminated.

One of the difficulties encountered in the use of air pumps and particularly hand pumps is that the lubricating oil is liable to be forced through the flexible connection which connects the pump to the tire nipple and thereby find its way into the tire with more or less objectionable results; for example, the oil attacks the tire and causes the tire to rot, thereby materially detracting from its period of usefulness.

My invention contemplates the provision of means whereby the lubricating oil will be trapped in an oil-receiving chamber interposed between the cylinder and the flexible connection so that the objection above noted will be eliminated.

In accomplishing the desired result I prefer to construct the air pump with a cylinder connected to a hollow base provided with an oil trap and having a valved port effecting communication between the cylinder and the trap with the valve opening in the direction of the trap and an unimpeded conduit or flexible connection between the trap and the tire. In other words, I eliminate the usual valve in the flexible connection so that the air will be free to pass from the trap into the tire except for the usual valve in the tire nipple and I am thereby enabled to eliminate the liability of objectionable lubricating oil entering the tire.

There are other details of importance in my invention, such as, for example, the inexpensive and convenient manner of attaching the cylinder to the base in which the trap is located so that an efficient connection can be established between the thin walled cylinder and the relatively heavy base and I have, in addition, provided a novel form of piston although the latter per se will be described and claimed specifically in a companion application executed by me of even date herewith.

In the drawings,

Fig. 1 is a vertical, longitudinal, sectional view through a pump base, its cylinder and piston, the flexible connection, the piston rod and the handle being shown in elevation, and Fig. 2 is a detail perspective view on a reduced scale of the pump base.

Referring now to the drawings by numerals of reference:

1 designates the base of the pump which may consist of cast iron formed with a hollow portion or chamber 2, constituting a trap for the oil discharged from the cylinder 3, as will be presently explained. The base is provided with a projecting portion or flange 4, upon which the operator may place his foot to hold the base firm upon its support during the pumping operation, as will be well understood.

The chamber 2 is provided with an open upper end 5 to receive the lower end or cap piece 6 of the cylinder 3 and there is an additional internally threaded nipple opening 7 for the nipple 8, to which the flexible tube or connection 9 is attached, said connection having a nipple-engaging union 10 at its free end, as will be well understood, whereby the flexible tube may be secured to the tire nipple in the usual way.

The cap 6 is cup-shaped, having a concave bottom 11 with a convex center 12, provided with a threaded opening 13 to receive the nipple 14 of the valve cage 15, in which is an outwardly opening valve 16 adapted to seat upon the seat 17 during the upward stroke of the piston.

The cap 6 is of relatively heavy material, preferably of brass and it has external threads 18, which are adapted to engage the internal threads 19 in the opening 5, as will be clearly seen by Fig. 1.

The base 1 is preferably of cast iron and usually there is not enough stock in the tubular cylinder 3 as constructed for a direct connection between the cylinder 3 and the base. In order to construct the cylinder of relatively light material and provide sufficient stability for the connection between the cylinder and the base I have availed myself of the use of the relatively heavy cap 6, which may be welded or otherwise secured to the cylinder 3.

In actual practice I prefer to construct the base of iron and the cap and cylinder of brass.

By reference to Fig. 1 it will be observed that the concave portion 11 constitutes a lubricant-receiving trough or groove in which may be received an appropriate amount of lubricating oil for the piston. The piston is shown as consisting of substantially two main parts 20 and 21. The part 20 may be cast and have sufficient stock to provide an efficient connection between itself and the piston rod 22, which will be threaded thereinto, as shown in Fig. 1.

The piston rod is shown as provided with a shoulder 23, against which the part 21 may abut. The member 21 is shown as a disk having a plurality of air inlet openings 24 to allow air to pass through them into the valve chamber 25 formed by the hollow portion 26 in the member 20 and the cap.

Within this chamber is shown a loosely fitting disk valve 27 adapted to freely slide on the retracted portion 28 of the valve rod 22 so that when the piston is moving on its out stroke or in an upward direction, as shown, the valve 27 will be off its seat and rest against the member 20. The disk, however, is of less diameter than the diameter of the chamber 25 so that air may pass through the ports 24, through the chamber and through the port or ports 29 in the casting 20, supplying air to the compression chamber 30 of the pump.

During this time the valve 16 will be seated upon its seat 17 so that the chamber 30 will be charged with air. On the down stroke of the piston the valve 27 will close the openings 24 so that the air in chamber 30 will be put under compression and be forced through the nipple 14, through the valve cage into the trap or chamber 2 and out through the unrestricted nipple and conduit 9 into the tire.

The bottom of the piston is concave to conform to the convex portion of the cup so that the perimeter of the piston may dip into the oil in the groove 11 in order that the piston can be lubricated, it being apparent by reference to Fig. 1 that the disk 21 in addition to serving as a cover for the valve cage for disk 27, also constitutes a clamp for clamping the piston leather 31 between it and the piston member 20 so that the leather will be held in place.

When the piston moves on its out stroke, which is the air intake stroke for the pump, the chamber 30 will be charged with air so that on the compression stroke of the piston the air will be expelled and with it unavoidably some of the lubricating oil. This lubricating oil, however, will precipitate in the trap 2 so that liability of its entering the tire will be eliminated.

The trap has sufficient capacity to receive an appreciable quantity of oil without interfering with the air pumping operation and since the pump will be ordinarily used only intermittently, the oil will have an opportunity to evaporate or dry in the trap between pumping operations. If, however, the constant use of the pump renders the evaporation of the oil impractical, the nipple 8 can be unscrewed from the base and the trapped oil may be discharged from the trap by inverting the pump. In actual practice, however, this will infrequently be necessary.

What I claim and desire to secure by Letters-Patent is:

1. In an air pump, a cylinder, a piston therein, a ported cap closing the lower end of the cylinder, an outwardly opening valve in the cap, a tire-nipple-engaging tube, and a hollow base having an oil trapping chamber between the tube and the port in the cap.

2. In an air pump, a hollow base having a discharge port, a pump cylinder having a relatively thin wall, a cap having a relatively thick wall closing one end of the cylinder, a threaded connection between the cap and the base, a valved port in the cap discharging into the hollow base, and a piston in the cylinder.

In testimony whereof I affix my signature.

WILLIAM COFFIN COLEMAN.